United States Patent
Nagaoka

(10) Patent No.: US 12,066,687 B2
(45) Date of Patent: Aug. 20, 2024

(54) LENS BARREL AND OPTICAL DEVICE

(71) Applicant: NIKON CORPORATION, Tokyo (JP)

(72) Inventor: Koji Nagaoka, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 547 days.

(21) Appl. No.: 17/419,074

(22) PCT Filed: Dec. 12, 2019

(86) PCT No.: PCT/JP2019/048599
§ 371 (c)(1),
(2) Date: Jun. 28, 2021

(87) PCT Pub. No.: WO2020/137563
PCT Pub. Date: Jul. 2, 2020

(65) Prior Publication Data
US 2022/0075140 A1 Mar. 10, 2022

(30) Foreign Application Priority Data
Dec. 28, 2018 (JP) .................................. 2018-247796

(51) Int. Cl.
| | |
|---|---|
| *G02B 7/02* | (2021.01) |
| *G02B 7/04* | (2021.01) |
| *G02B 7/10* | (2021.01) |
| *G03B 5/00* | (2021.01) |
| *G03B 13/36* | (2021.01) |
| *G03B 17/12* | (2021.01) |

(52) U.S. Cl.
CPC ............. *G02B 7/04* (2013.01); *G02B 7/021* (2013.01); *G02B 7/102* (2013.01); *G03B 5/00* (2013.01); *G03B 13/36* (2013.01); *G03B 17/12* (2013.01)

(58) Field of Classification Search
CPC .......... G02B 7/04; G02B 7/021; G02B 7/102; G03B 5/00; G03B 13/36; G03B 17/12
USPC .................... 359/676–706, 822–826
See application file for complete search history.

(56) References Cited

U.S. PATENT DOCUMENTS

| 5,907,439 A | 5/1999 | Matsui |
| 6,104,551 A | 8/2000 | Matsui |

(Continued)

FOREIGN PATENT DOCUMENTS

| JP | H10-142471 A | 5/1998 |
| JP | H11-326734 A | 11/1999 |
| JP | 2003-140018 A | 5/2003 |

OTHER PUBLICATIONS

Mar. 29, 2022 Office Action issued in Japanese Patent Application No. 2020-563053.

(Continued)

*Primary Examiner* — Mahidere S Sahle
(74) *Attorney, Agent, or Firm* — Oliff PLC

(57) ABSTRACT

A lens barrel and an optical device that can be reduced in size. A lens barrel includes: a cylinder cam with a cam groove; a first movement section having a first cam follower that moves along one side surface of the cam groove in the optical axis OA direction; and a second movement section having a second cam follower that moves along the other side surface of the cam groove in the optical axis OA direction. The position of the first cam follower in the optical axis OA direction and the position of the second cam follower in the optical axis OA direction can overlap each other at least partially.

18 Claims, 9 Drawing Sheets

(56) References Cited

U.S. PATENT DOCUMENTS

| | | | |
|---|---|---|---|
| 2003/0081325 A1 | 5/2003 | Nomura et al. | |
| 2011/0038058 A1* | 2/2011 | Fukai | G03B 17/04 |
| | | | 359/700 |
| 2019/0162926 A1* | 5/2019 | Sasaki | G02B 7/10 |

OTHER PUBLICATIONS

Feb. 10, 2020 Search Report issued in International Patent Application No. PCT/JP2019/048599.
Mar. 31, 2023 Office Action issued in Chinese Patent Application No. 201980085763.1.
Aug. 23, 2022 Office Action issued in Chinese Patent Application No. 201980085763.1.
Nov. 1, 2022 Office Action issued in Japanese Patent Application No. 2020-563053.

* cited by examiner

LENS BARREL AND OPTICAL DEVICE

TECHNICAL FIELD

The present invention relates to a lens barrel and an optical device.

BACKGROUND ART

A conventional zoom lens device is configured such that one cam groove functions as cam grooves for two lens units.

The present invention provides a lens barrel and an optical device enabling a reduction in length in an optical axis direction.

Patent Document 1: Japanese Unexamined Patent Application, Publication No. H11-326734

DISCLOSURE OF THE INVENTION

A first aspect of the present invention is directed to a lens barrel including: a cam groove at least a portion of which forms an angle with respect to a direction of an optical axis; a cam tube having the cam groove; a first movable member having a first cam follower configured to move along one side surface of the cam groove, the one side surface being located on one side in the direction of the optical axis; and a second movable member having a second cam follower configured to move along an other side surface of the cam groove, the other side surface being located on an other side in the direction of the optical axis. The lens barrel is capable of causing a position of the first cam follower and a position of the second cam follower to at least partially overlap with each other in the direction of the optical axis.

A second aspect of the present invention is directed to a lens barrel including: a tube member having a rectilinear motion groove extending in a direction of an optical axis; a first movable member having a first cam follower configured to move along one side surface of the rectilinear motion groove, the one side surface being located on one side in a circumferential direction around the optical axis; and a second movable member having a second cam follower configured to move along an other side surface of the rectilinear motion groove, the other side surface being located on an other side in the circumferential direction around the optical axis. The lens barrel is capable of causing a position of the first cam follower and a position of the second cam follower to at least partially overlap with each other in the direction of the optical axis.

A third aspect of the present invention is directed to an optical device including the lens barrel described above.

PREFERRED MODE FOR CARRYING OUT THE INVENTION

First Embodiment

Figure 1:
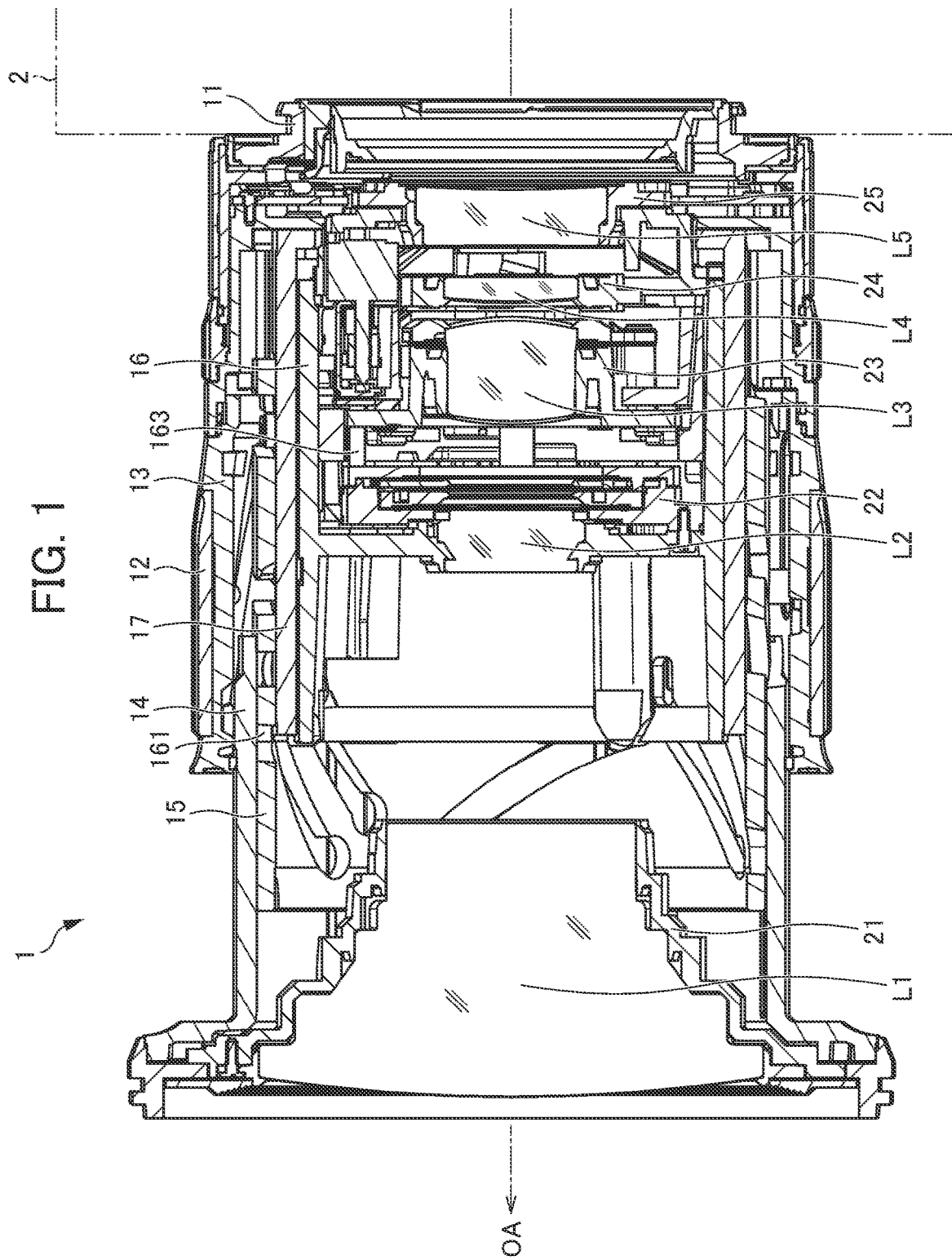
FIG. 1 is a cross-sectional view illustrating a lens barrel 1 according to a first embodiment.

A lens barrel 1 according to a first embodiment will be described with reference to drawings and the like. FIG. 1 is a cross-sectional view illustrating the lens barrel 1 according to the first embodiment. The lens barrel 1 has a lens-side mount part 11 shown in a right end portion of FIG. 1, and thus, is configured as an interchangeable type lens barrel which is detachably attachable to a body-side mount part (not illustrated) provided to a camera body 2. However, this is a non-limiting example. The lens barrel 1 may be integrated with the camera body 2. In the following description, a leftward side and a rightward side along an optical axis OA in each figure are referred to as an object side and an image side, respectively.

The lens barrel 1 constitutes a zoom lens having a variable focal length, and includes a zoom ring 12, a rotating tube 13 configured to rotate together with the zoom ring 12, a first lens-unit-moving rectilinear motion tube 14, a cam tube 15, a fixed tube 17, and a second lens-unit-moving rectilinear motion tube 16, which are arranged in this order in a radially inward direction of the lens barrel 1. The fixed tube 17 is fixed to the lens-side mount part 11. The zoom ring 12 and the cam tube 15 are rotatable around the optical axis OA, with respect to the fixed tube 17. The first lens-unit-moving rectilinear motion tube 14 and the second lens-unit-moving rectilinear motion tube 16 are configured to move rectilinearly in the direction of the optical axis OA, in accordance with the rotation of the zoom ring 12 and the cam tube 15 with respect to the fixed tube 17.

The lens barrel 1 further includes, as an optical system, a first lens unit L1, a second lens unit L2, a third lens unit L3, a fourth lens unit L4, and a fifth lens unit L5. The fourth lens unit L4 constitutes a focus lens configured to adjust a position of a focal point of the optical system by moving in the direction of the optical axis while being driven by a motor.

The first lens unit L1 has an outer periphery held by a first lens unit-holding frame 21. The first lens unit-holding frame 21 is fixed to the first lens-unit-moving rectilinear motion tube 14. The second lens unit L2 has an outer periphery held by a second lens unit-holding frame 22. The third lens unit L3 has an outer periphery held by a third lens unit-holding frame 23. The fourth lens unit L4 has an outer periphery held by a fourth lens unit-holding frame 24. The fifth lens unit L5 has an outer periphery held by a fifth lens unit-holding frame 25. The second lens unit-holding frame 22 and the fifth lens unit frame L5 are fixed to the second lens-unit-moving rectilinear motion tube 16. The third lens unit-holding frame 23 and the fourth lens unit frame L4 are arranged radially inside the second lens-unit-moving rectilinear motion tube 16, and are movable in the direction of the optical axis OA.

(Cam Tube 15)

Figure 2:
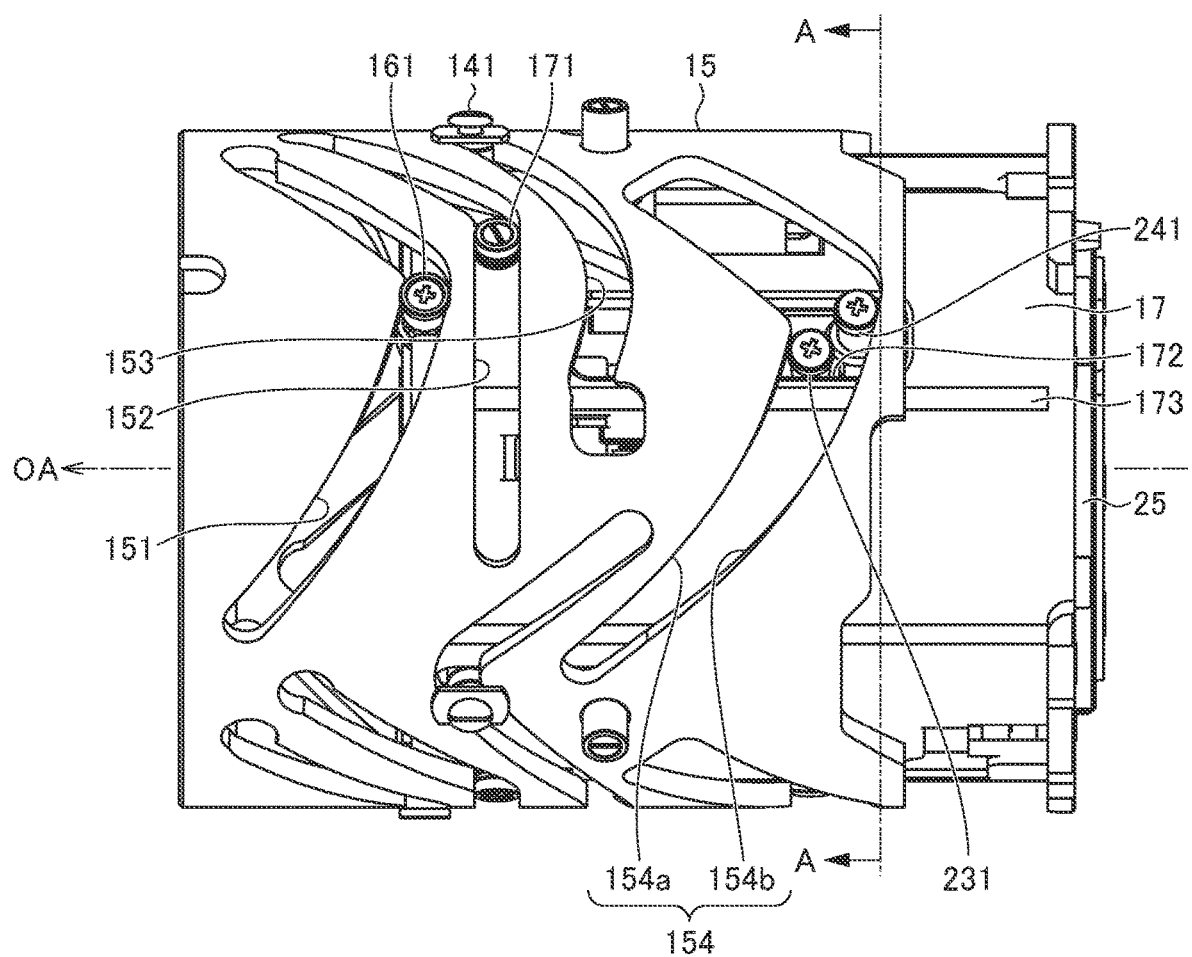
FIG. 2 is a side view illustrating a cam tube 15 and components arranged radially inside the cam tube 15 when the lens barrel 1 is in a wide position.
Figure 3:
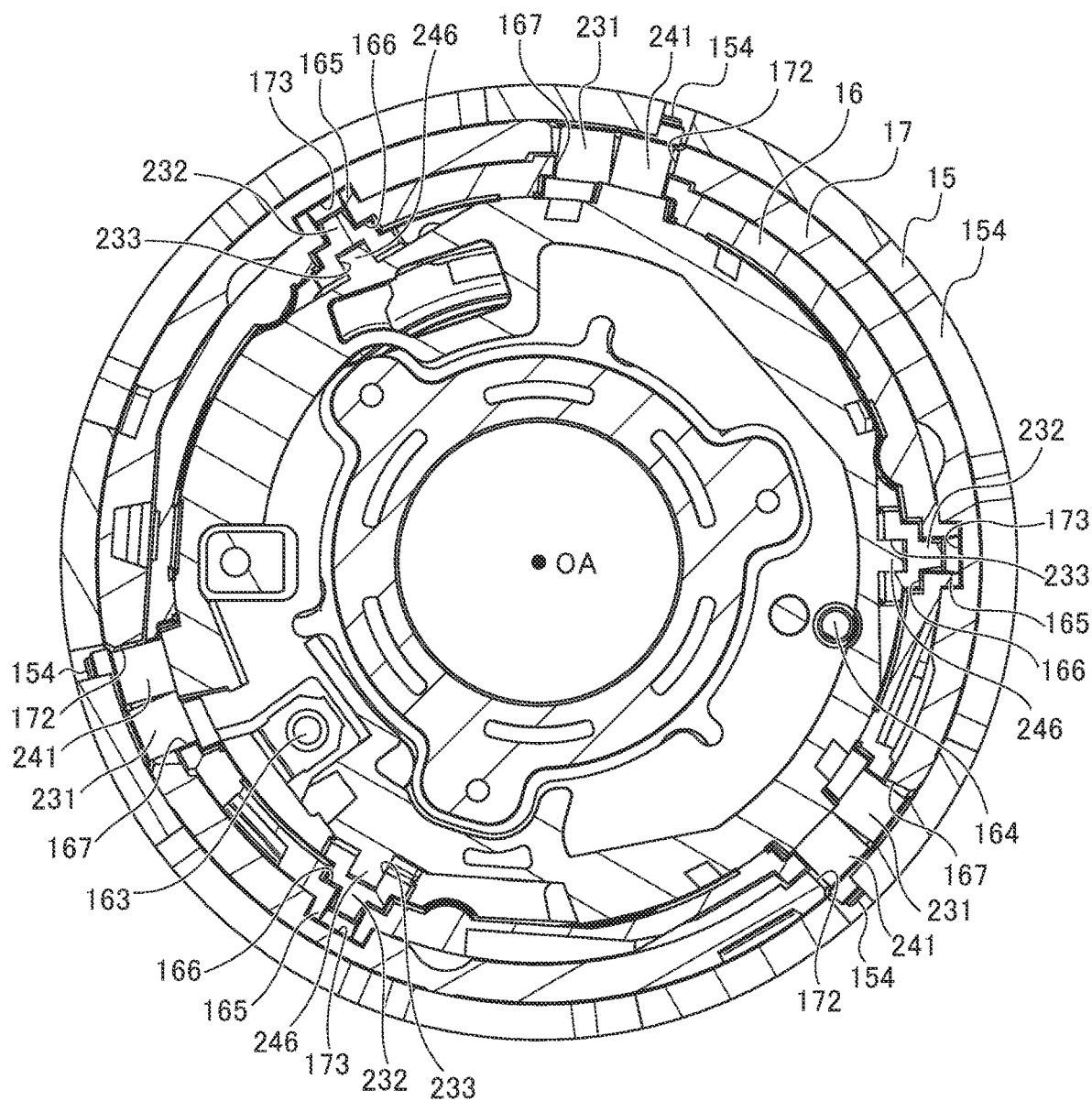
FIG. 3 is a cross-sectional view illustrating the cam tube 15 and the components arranged radially inside the cam tube 15 when the lens barrel 1 is in the wide position, the cross-sectional view being taken along line A-A in FIG. 1.

FIG. 2 is a side view illustrating the cam tube 15 and components arranged radially inside the cam tube 15 when the lens barrel 1 is in a wide state. FIG. 3 is a cross-sectional view illustrating the cam tube 15 and the components arranged radially inside the cam tube 15 when the lens barrel 1 is in the wide state, the cross-sectional view being taken along line A-A in FIG. 1.

In the direction from the object side to the image side, the cam tube 15 has three first cam grooves 151, three second cam grooves 152, three third cam grooves 153, and three fourth cam grooves 154. Thus, the cam tube 15 has four different types of cam grooves each including three grooves.

Each of the first cam grooves 151 is engaged with an associated one of second unit cam followers 161 that project outward from three locations on an outer surface of the second lens-unit-moving rectilinear motion tube 16, the three locations being equidistant from each other in a circumferential direction of the outer surface of the second lens-unit-moving rectilinear motion tube 16.

Each of the second cam grooves 152 is engaged with an associated one of rollers 171 that project outward from three locations on an outer surface of the fixed tube 17, the three locations being equidistant from each other in a circumferential direction of the outer surface of the fixed tube 17.

Each of the third cam grooves 153 is engaged with an associated one of first unit cam followers 141 that project inward from three locations on an inner surface of the first lens-unit-moving rectilinear motion tube 14, the three locations being equidistant from each other in a circumferential direction of the inner surface of the first lens-unit-moving rectilinear motion tube 14.

Each of the fourth cam grooves 154 has a cam's cut end face 154a closer to the object side and a cam's cut end face 154b closer to the image side. The cam's cut end faces 154a and 154b are not parallel to each other and at least partially differ in shape from each other.

In each of the fourth cam grooves 154, the cam's cut end face 154a closer to the object side is engaged with an associated one of third unit cam followers 231 that project outward from three locations on an outer surface of the third lens unit-holding frame 23, the three locations being equidistant from each other in a circumferential direction of the outer surface of the third lens unit-holding frame 23. In each of the fourth cam grooves 154, the cam's cut end face 154b closer to the image side is engaged with an associated one of fourth unit cam followers 241 that project outward from three locations on an outer surface of a fourth lens unit-moving tube 24A holding the fourth lens unit-holding frame 24, the three locations being equidistant from each other in a circumferential direction of the outer surface of the fourth lens unit-moving tube 24A.

The third unit cam follower 231 and the fourth unit cam follower 241 are not in contact with the cam's cut end faces 154b and 154a, respectively. Alternatively, the cam followers 231 and 241 may contact with the cam's cut end faces 154b and 154a in, for example, a tele state to be described later. Thus, each of the third unit cam followers 231 (i.e., the third lens unit-holding frame 23 and the third lens unit L3) and the associated one of the fourth unit cam followers 241 (i.e., the fourth lens unit-holding frame 24 and the fourth lens unit L4) are driven by way of one fourth cam groove 154, but are moved along different trajectories.

(Fixed Tube 17)

The fixed tube 17 has rectilinear motion grooves 172 that penetrate a peripheral wall of the fixed tube 17, extend in the direction of the optical axis, and are arranged at three locations. In each of the rectilinear motion grooves 172, the third unit cam follower 231 and the fourth unit cam follower 241 are movably arranged while passing through the rectilinear motion groove 172. Further, as illustrated in FIG. 3, the fixed tube 17 has fixed tube's guiding key grooves 173 formed at three locations on an inner surface of the fixed tube 17 and extending in the direction of the optical axis OA, the three locations being equidistant from each other in the circumferential direction of the inner surface of the fixed tube 17.

(Second Lens-Unit-Moving Rectilinear Motion Tube 16)

The second lens unit-holding frame 22 is provided integrally with the inner periphery of the second lens-unit-moving rectilinear motion tube 16. The fifth lens unit-holding frame 25 holding the outer periphery of the fifth lens unit L5 is fixed to an image side-end of the second lens-unit-moving rectilinear motion tube 16. That is, the second lens unit L2, the second lens unit-holding frame 22, the fifth lens unit L5, and the fifth lens unit-holding frame 25 move in the direction of the optical axis OA, integrally with the second lens-unit-moving rectilinear motion tube 16.

As described earlier, the second lens-unit-moving rectilinear motion tube 16 has the second unit cam followers 161 projecting outward and attached to the three equidistant locations on the outer surface of the second lens-unit-moving rectilinear motion tube 16. The second unit cam followers 161 are engaged with the first cam grooves 151 of the cam tube 15. Accordingly, the second lens-unit-moving rectilinear motion tube 16 moves along the first cam grooves 151 in accordance with the rotation of the cam tube 15.

Between the second lens unit-holding frame 22 and the fifth lens unit-holding frame 25 that are respectively integral with and fixed to the second lens-unit-moving rectilinear motion tube 16, a main guide bar 163 and a sub guide bar 164 extend in the direction of the optical axis OA (only the main guide bar 163 is illustrated in FIG. 1).

The second lens-unit-moving rectilinear motion tube 16 has rectilinear motion grooves 167 through which the third unit cam followers 231 and the fourth unit cam followers 241 pass to reach the fourth cam grooves 154 of the cam tube 15.

The second lens-unit-moving rectilinear motion tube 16 further has second unit-guiding keys 165 protruding outward from three locations on the outer surface of the second lens-unit-moving rectilinear motion tube 16 and extending in the direction of the optical axis OA, the three locations being equidistant from each other in the circumferential direction of the outer surface of the second lens-unit-moving rectilinear motion tube 16. The second unit-guiding keys 165 are fitted in the fixed tube's guiding key grooves 173, and are movable along the fixed tube's guiding key grooves 173 in the direction of the optical axis OA. Each of the second unit-guiding keys 165 is a bottomless groove and has a second unit's guiding key groove 166 formed radially inside the second unit-guiding key 165.

(Third Lens Unit-Holding Frame 23)

Figure 4:
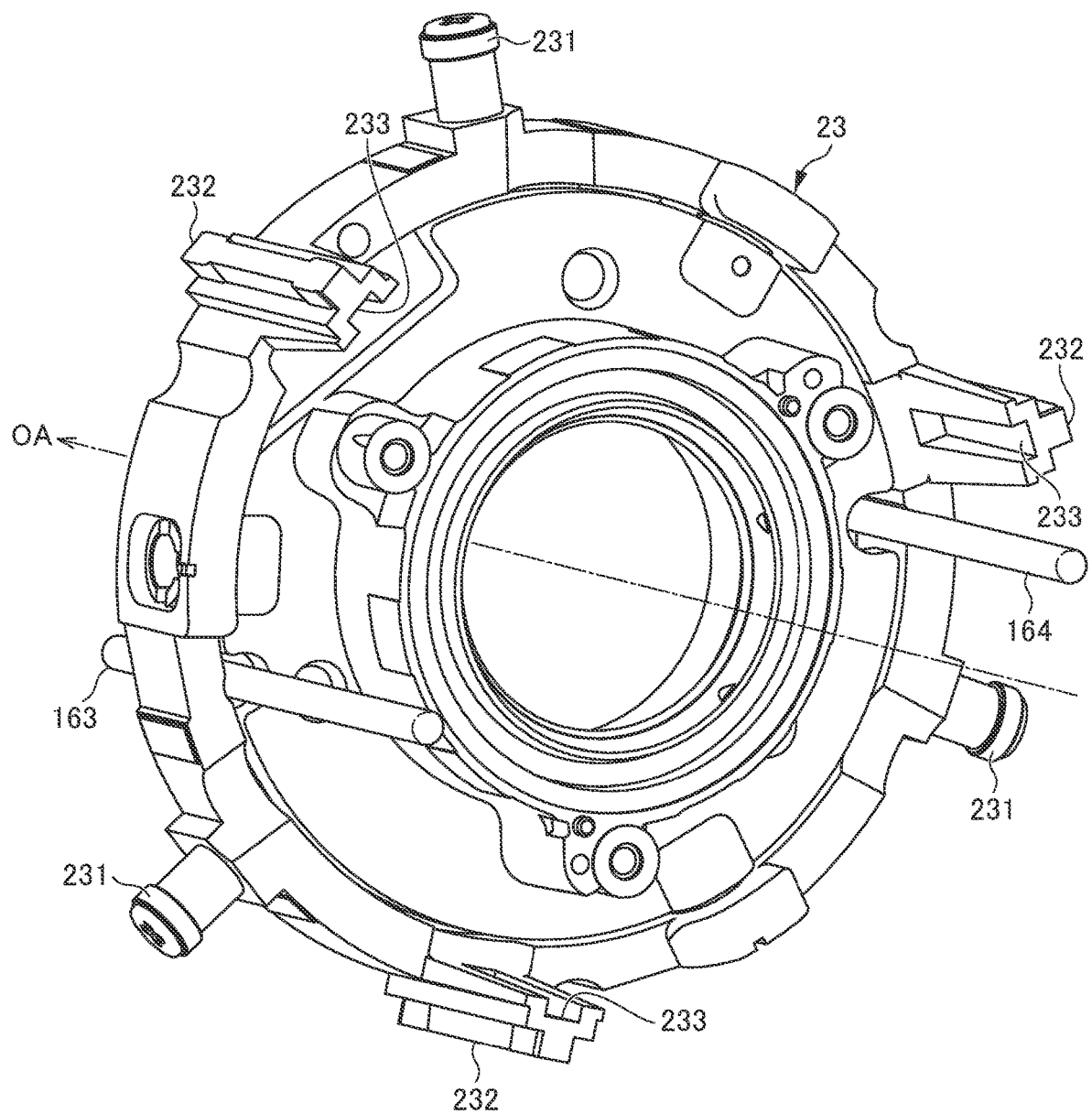
FIG. 4 is a perspective view illustrating a third lens unit-holding frame 23, as viewed from an image side.

FIG. 4 is a perspective view illustrating the third lens unit-holding frame 23, as viewed from the image side. The main guide bar 163 and the sub guide bar 164 pass through the third lens unit-holding frame 23.

The third lens unit-holding frame 23 has the third unit cam followers 231 and third unit-guiding keys 232 projecting from the outer surface of the third lens unit-holding frame 23. The third unit cam followers 231 are provided on the three locations equidistant from each other in the circumferential direction of the outer surface, whereas the third unit-guiding keys 232 are provided at different three locations equidistant from each other in the circumferential direction of the outer surface. Each third unit-guiding key 232 has a third unit's guiding key groove 233 formed radially inside the third unit-guiding key 232.

(Fourth Lens Unit-Holding Frame 24)

Figure 5:
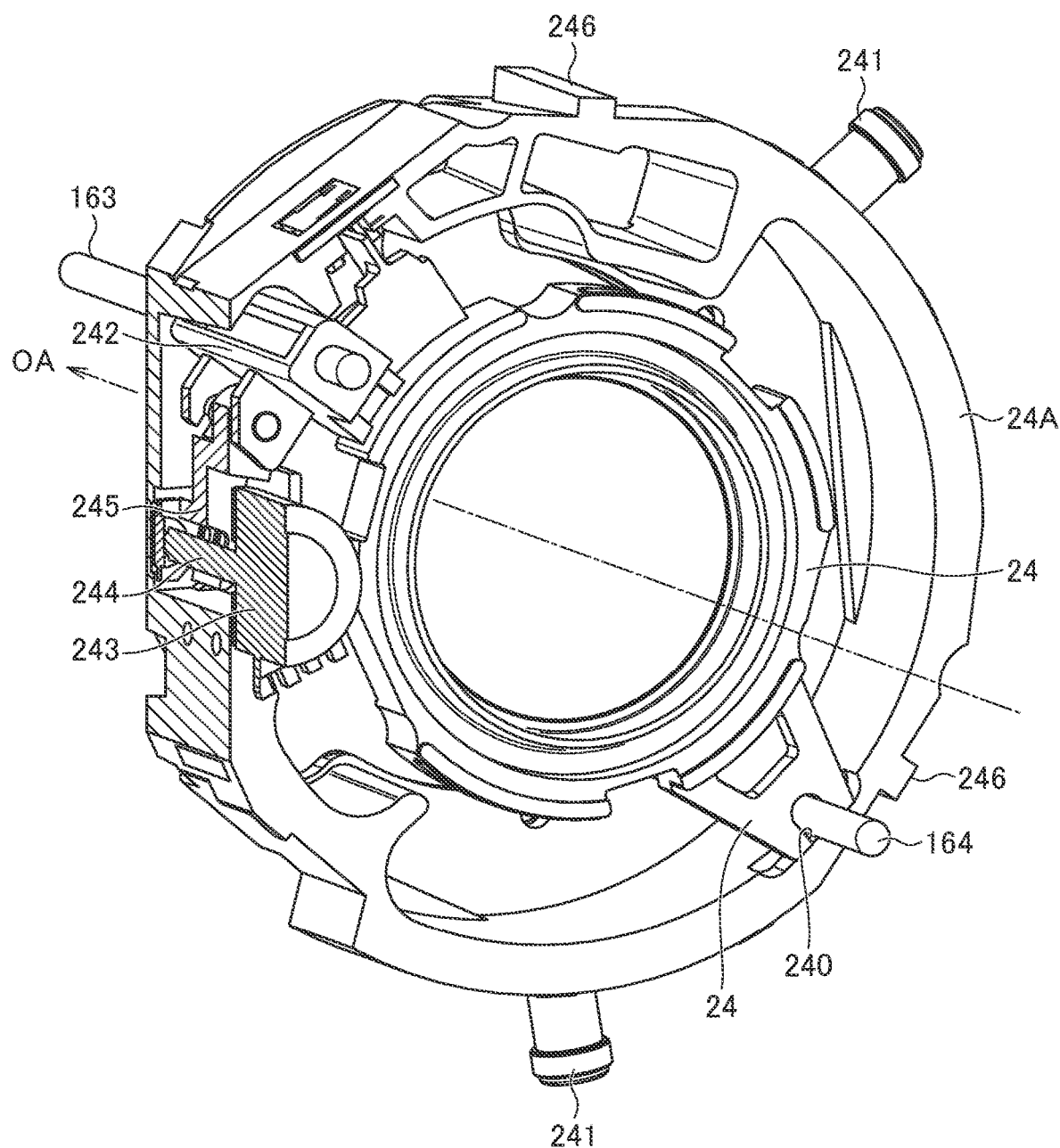
FIG. 5 is a perspective view as viewed from the image side, illustrating a fourth lens unit-holding frame 24 that holds a fourth lens unit L4 and a fourth lens unit-moving tube 24A that holds the fourth lens unit-holding frame 24, and illustrates a portion with a stepping motor 243 attached thereto in cross section.

FIG. 5 is a perspective view as viewed from the image side, and illustrates the fourth lens unit-holding frame 24 that holds the fourth lens unit L4 and the fourth lens unit-moving tube 24A that holds the fourth lens unit-holding frame 24 such that the frame 24 is movable in the direction of the optical axis OA. A stepping motor 243 for driving the fourth lens unit L4 in the direction of the optical axis OA is fastened to the fourth lens unit-moving tube 24A. The portion with the stepping motor 243 attached thereto is illustrated in cross section.

Figure 6:
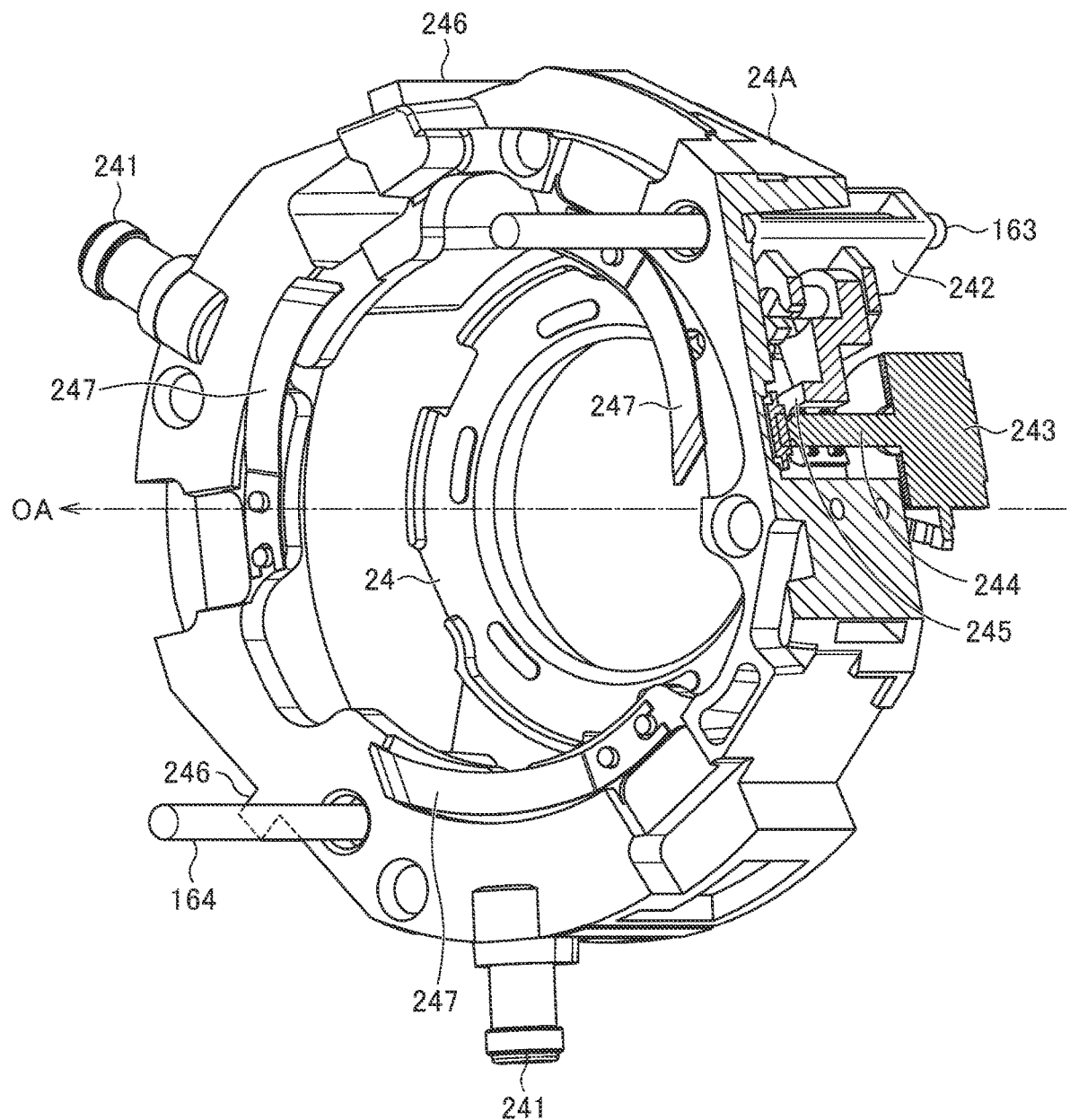
FIG. 6 is a perspective view as viewed from an object side, illustrating the fourth lens unit-holding frame 24 and the fourth lens unit-moving tube 24A that holds the fourth lens unit-holding frame 24, and illustrates the portion with the stepping motor 243 attached thereto in cross section.

FIG. 6 is a perspective view as viewed from the image side, and illustrates the fourth lens unit-holding frame 24 and the fourth lens unit-moving tube 24A of FIG. 5. FIG. 6 illustrates the portion with the stepping motor 243 attached thereto in cross section.

The fourth lens unit-holding frame 24 can move along the main guide bar 163 and the sub guide bar 164 by being driven by the stepping motor 243. The fourth lens unit-holding frame 24 has, on its outer periphery, a U-shaped engagement portion 240 opening radially outward and being engaged with the sub guide bar 164, and a fitting portion 242 receiving the main guide bar 163 fitted therein. The fitting portion 242 has walls through which the main guide bar 163 is inserted and to which two portions of the main guide bar 163 are fitted, the two portions being spaced apart from each other by a predetermined distance in the direction of the optical axis OA. The fitting portion 242 prevents the fourth lens unit-holding frame 24 from being inclined with respect to the main guide bar 163. The two walls of the fitting portion 242 are spaced apart from each other by the predetermined distance in the direction in which the main guide bar extends, and are penetrated by the main guide bar 163. This configuration ensures a long engagement length with respect to the main guide bar 163.

(Fourth Lens Unit-Moving Tube 24A)

The fourth lens unit-moving tube 24A has the stepping motor 243 attached thereto. The stepping motor 243 includes a lead screw 244 extending in the direction of the optical axis OA and having a thread formed on an outer periphery thereof. The thread on the lead screw 244 is meshed with a movable member 245. When the stepping motor 243 rotates the lead screw 244, the movable member 245 moves in the direction in which the lead screw 244 extends. The movable member 245 is fixed to the fitting portion 242 in terms of position in the direction of the optical axis OA. According to a movement component of the movable member 245 in the direction of the optical axis OA, the fitting portion 242 moves in the direction of the optical axis OA together with the fourth lens unit-holding frame 24.

The fourth lens unit-moving tube 24A has, on its outer surface, the fourth unit cam followers 241 projecting outward and arranged at the three locations equidistant from each other in the circumferential direction of the outer surface (among the three cam followers 241, one being illustrated in FIG. 2, all being illustrated in FIG. 3, and two being illustrated in FIGS. 5 and 6). The fourth lens unit-moving tube 24A further has, on its outer surface, fourth unit-guiding keys 246 extending in the direction of the optical axis OA and arranged at three locations equidistant from each other in the circumferential direction of the outer surface (among the three fourth unit-guiding keys 246, all being illustrated in FIG. 3, and two being illustrated in FIGS. 5 and 6).

As illustrated in FIG. 3, each third unit cam follower 231 and the associated fourth unit cam follower 241 are not aligned with each other in the direction of the optical axis OA, and are out of coincidence with each other in the circumferential direction.

The fourth unit-guiding keys 246 on the outer peripheral surface of the fourth lens unit-moving tube 24A are fitted in the third unit's guiding key grooves 233. That is, the fourth lens unit-moving tube 24A is guided and rectilinearly moved by means of the fourth unit-guiding keys 246 and the third unit's guiding key grooves 233.

The third unit-guiding keys 232 in which the third unit's guiding key grooves 233 are defined are provided on the outer peripheral surface of the third lens unit-holding frame 23 and are fitted in the second unit's guiding key grooves 166. That is, the third lens unit-holding frame 23 is guided and rectilinearly moved by means of the third unit-guiding keys 232 and the second unit's guiding key grooves 166.

The second unit-guiding keys 165 in which the second unit's guiding key grooves 166 are defined are fitted in the fixed tube's guiding key grooves 173. That is, the second lens-unit-moving rectilinear motion tube 16 is guided and rectilinearly moved by means of the second unit-guiding keys 165, the second unit's guiding key grooves 166, and the fixed tube's guiding key grooves 173.

As illustrated in FIG. 6, the fourth lens unit-moving tube 24A has, on a surface facing the object side, leaf springs 247 attached to three locations equidistant from each other in the circumferential direction. Each leaf spring 247 is a plate-shaped metal member having an arc shape substantially centered on the optical axis OA. Each leaf spring 247 has one end fixed to the fourth lens unit-moving tube 24A, and the other end projecting toward the object side.

The fourth lens unit-moving tube 24A is arranged such that the object side-surface thereof is adjacent to the third lens unit-holding frame 23. The leaf springs 247 are in contact with an image side-surface of the third lens unit-holding frame 23 and urge the third lens unit-holding frame 23 and the fourth lens unit-moving tube 24A such that the frame 23 and the tube 24A are spaced apart from each other in the direction of the optical axis OA.

As described earlier, each of the third unit cam followers 231 provided on the outer surface of the third lens unit-holding frame 23 and each of the fourth unit cam followers 241 provided on the outer surface of the fourth lens unit-moving tube 24A are engaged with an associated one of the fourth cam grooves 154.

The third lens unit-holding frame 23 and the fourth lens unit-moving tube 24A are guided and rectilinearly moved in the direction of the optical axis OA by means of the fourth unit-guiding keys 246, the third unit-guiding keys 232, the third unit's guiding key grooves 233, and the second unit's guiding key grooves 166. When the third lens unit-holding frame 23 and the fourth lens unit-moving tube 24A are urged such that the distance therebetween increases, each of the third unit cam followers 231 comes into contact with the cam's cut end face 154a of the associated fourth cam groove 154 closer to the object side, as illustrated in FIG. 2. Concurrently, each of the fourth unit cam followers 241 comes into contact with the cam's cut end face 154b of the associated fourth cam groove 154 closer to the image side.
(Zooming Operation)

The lens barrel 1 is configured such that rotation of the zoom ring 12 on the outer periphery of the lens barrel 1 rotates the rotating tube 13 provided radially inside the zoom ring 12. The rotation of the rotating tube 13 causes the cam tube 15 to rectilinearly move while rotating.

The second cam grooves 152 of the cam tube 15 are engaged with the rollers 171 provided on the fixed tube 17. Accordingly, the rotation of the cam tube 15 causes the engagement position between each roller 171 and the associated second cam groove 152 to move, whereby the cam tube 15 moves in the direction of the optical axis OA.

When the cam tube 15 rotates while moving in the direction of the optical axis OA, the first lens-unit-moving rectilinear motion tube 14 moves in the direction of the optical axis OA, along the third cam grooves 153. Since the first lens-unit-moving rectilinear motion tube 14 has the first lens unit-holding frame 21 fixed thereto, the movement of the first lens-unit-moving rectilinear motion tube 14 in the direction of the optical axis OA moves the first lens unit-holding frame 21 and the first lens unit L1 in the direction of the optical axis OA.

When the cam tube 15 rotates while moving in the direction of the optical axis OA, the second lens-unit-moving rectilinear motion tube 16 moves in the direction of the optical axis OA, along the first cam grooves 151. The second lens unit-holding frame 22 is provided radially inside the second lens-unit-moving rectilinear motion tube 16 while the fifth lens unit-holding frame 25 is fixed to the rear end of the second lens-unit-moving rectilinear motion tube 16. Accordingly, the movement of the second lens-unit-moving rectilinear motion tube 16 in the direction of the optical axis OA rectilinearly moves the second lens unit-holding frame 22, the second lens unit L2, the fifth lens unit-holding frame 25, and the fifth lens unit L5.

One end of the main guide bar 163 and one end of the sub guide bar 164 are fixed to the second lens unit-holding frame 22 of the second lens-unit-moving rectilinear motion tube 16. The other end of the main guide bar 163 and the other end of the sub guide bar 164 are fixed to the fifth lens unit-holding frame 25. Accordingly, the main guide bar 163 and the sub guide bar 164 also rectilinearly move when the second lens-unit-moving rectilinear motion tube 16 moves in the direction of the optical axis OA.
(Focusing Operation)

To perform a focusing operation, the stepping motor 243 drives and rotates the lead screw 244. The rotation of the lead screw 244 moves the movable member 245, the fitting portion 242, the fourth lens unit-holding frame 24, the fourth lens unit L4 as the focus lens, thereby performing the focusing operation.

As described earlier, the third lens unit-holding frame 23 and the fourth lens unit-moving tube 24A are urged by the leaf springs 247 such that the frame 23 and the tube 24A are spaced apart from each other. Accordingly, the third unit cam followers 231 provided on the third lens unit-holding frame 23 are in contact with the cam's cut end faces 154a of the fourth cam grooves 154 closer to the object side whereas the fourth unit cam followers 241 provided on the fourth lens unit-moving tube 24A are in contact with the cam's cut end faces 154b closer to the image side.

Figure 7:
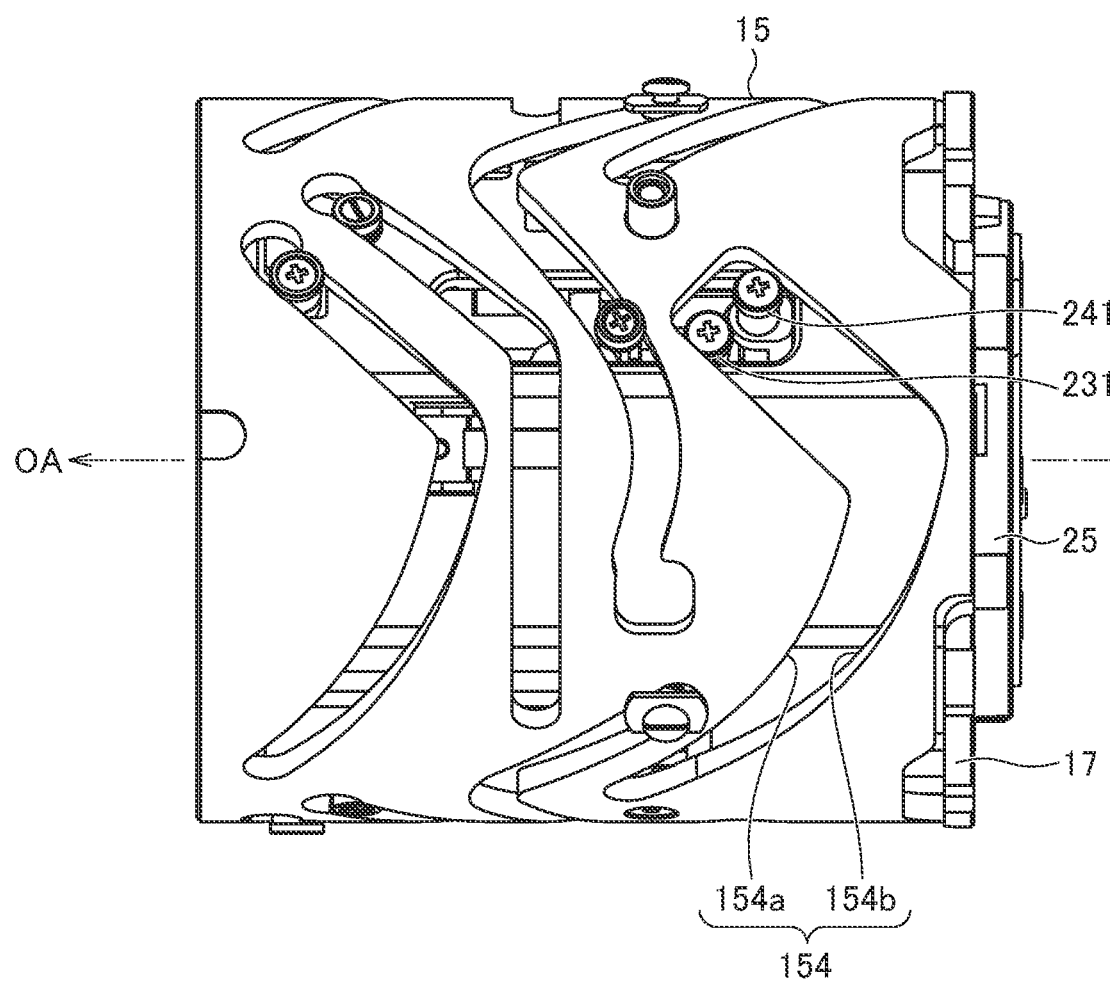
FIG. 7 is a side view illustrating the cam tube 15 and the components arranged radially inside the cam tube 15 when the lens barrel 1 is in a barrel retraction state in which the lens barrel 1 has a shortest length.
Figure 8:
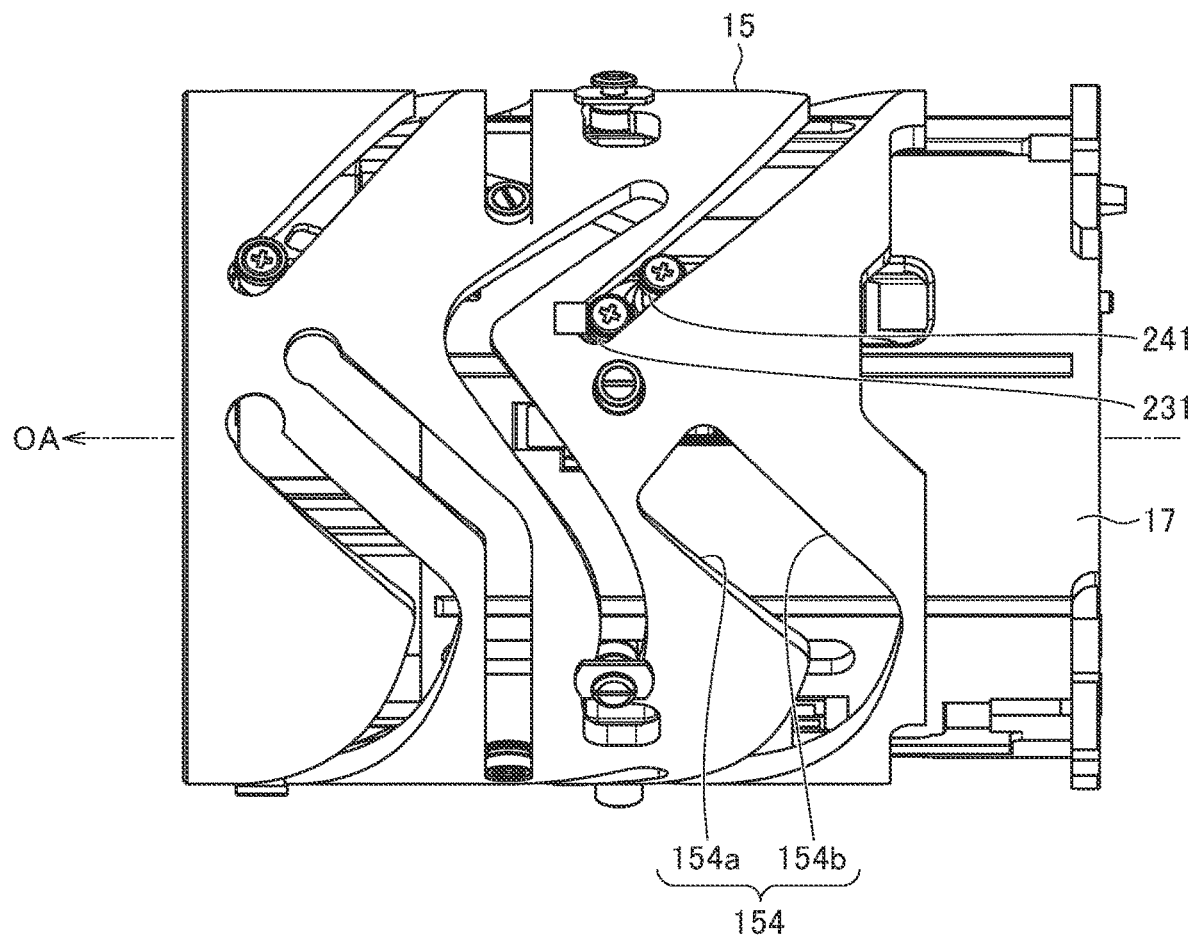
FIG. 8 is a side view illustrating the cam tube 15 and the components arranged radially inside the cam tube 15 when the lens barrel 1 is in a tele state.

Here, as described earlier, FIG. 2 is a side view illustrating the cam tube 15 and the components arranged radially inside the cam tube 15 when the lens barrel 1 is in the wide state (a ready-to-image state). FIG. 7 is a side view illustrating the cam tube 15 and the components arranged radially inside the cam tube 15 when the lens barrel 1 is in a barrel retraction state (a non-imaging state) in which the lens barrel 1 is shorter than in the wide state. FIG. 8 is a side view illustrating the cam tube 15 and the components arranged radially inside the cam tube 15 when the lens barrel 1 is in the tele state (ready-to-image state).

When the cam tube 15 rotates while moving in the direction of the optical axis OA, the third unit cam followers 231 move along the cam's cut end faces 154a of the fourth cam grooves 154 closer to the object side, in the direction of the optical axis OA. Concurrently, the fourth unit cam followers 241 move along the cam's cut end faces 154b of the fourth cam grooves 154 closer to the imaging side, in the direction of the optical axis OA.

In the barrel retraction state illustrated in FIG. 7, the third unit cam follower 231 and the fourth unit cam follower 241 are positioned in an upper portion of the fourth cam groove in the figure. In the barrel retraction state, the position of the third unit cam follower 231 and that of the fourth unit cam follower 241 do not overlap with each other in the direction of the optical axis OA.

In the wide state illustrated in FIG. 2, the third unit cam follower 231 and the fourth unit cam follower 241 are positioned in a bent portion of the fourth cam groove in the figure, the bent portion being located close to a center of the fourth cam groove. In the wide state, the third lens unit L3 and the fourth lens unit L4 are in closest proximity to each other, and the position of the third unit cam follower 231 and that of the fourth unit cam follower 241 overlap with each other in the direction of the optical axis OA.

In the tele state illustrated in FIG. 8, the third unit cam follower 231 and the fourth unit cam follower 241 are positioned in a lower portion of the fourth cam groove in the figure. In the tele state, the position of the third unit cam follower 231 and that of the fourth unit cam follower 241 do not overlap with each other in the direction of the optical axis OA.

The states illustrated in FIGS. 7, 2, and 8 differ from each other in terms of the distance between the third unit cam follower 231 and the fourth unit cam follower 241 in the direction of the optical axis OA. That is, the third unit cam follower 231 and the fourth unit cam follower 241 move along different trajectories. When a magnification is changed from the wide state to the tele state, the third unit cam follower 231 and the fourth unit cam follower 241 can move along different trajectories, so that a spacing between the third lens unit L3 and the fourth lens unit L4 in the direction of the optical axis OA is variable. As a result of a change from the wide state to the barrel retraction state, the third unit cam follower 231 and the fourth unit cam follower 241 become more spaced apart from each other in the direction of the optical axis OA than in the wide state (ready-to-image state in which the third lens unit L3 is in closest proximity to the fourth lens unit L4). During a period from the start of barrel retraction (from a moment when the zoom ring 12 in the wide state illustrated in FIG. 2 is slightly rotated in a direction in which the barrel is retracted) to the completion of the barrel retraction (the state illustrated in FIG. 7), the third unit cam follower 231 and the fourth unit cam follower 241 move along an identical trajectory.

In the magnification-changing operation or the focusing operation, when the stepping motor 243 drives and rotates the lead screw 244, the movable member 245 is driven in the direction of the optical axis OA within the fourth lens unit-moving tube 24A, and the fourth lens unit-holding frame 24 is driven in the direction of the optical axis OA with respect to the fourth lens unit-moving tube 24A.

As described earlier, the fourth unit-guiding keys 246 are fitted in the third unit's guiding key grooves 233, the third unit-guiding keys 232 are fitted in the second unit's guiding key grooves 166, and the second unit-guiding keys 165 are fitted in the fixed tube's guiding key grooves 173. Rectilinear motion between the respective tubes is guided not by means of the cam followers, but by means of the guiding keys and the corresponding guiding key grooves between the respective tubes. The rectilinear motion between the respective tubes is guided in the same region in the circumferential direction. However, appropriate modifications may be made to this feature.

According to the first embodiment described above, each third unit cam follower 231 provided on the outer surface of the third lens unit-holding frame 23 and the associated fourth unit cam follower 241 provided on the outer surface of the fourth lens unit-moving tube 24A are engaged with one fourth cam groove 154.

This feature enables the cam tube 15 to have a reduced length in the direction of the optical axis OA in comparison with a case where independent cam grooves are formed for the respective cam followers. Further, in comparison with the case where independent cam grooves are formed for the respective cam followers, the distance between the third unit cam follower 231 and the fourth unit cam follower 241 can be shortened in the direction of the optical axis OA. This feature enables a reduction in size and an increase in flexibility of optical design or lens barrel design.

According to the embodiment, the third unit cam follower 231 and the fourth unit cam follower 241 are not aligned with each other in the direction of the optical axis OA and are out of coincidence with each other in the circumferential direction.

Accordingly, the third unit cam follower 231 and the fourth unit cam follower 241 can overlap with each other in the direction of the optical axis OA in at least a portion of the range where the cam followers 231 and 241 can move. According to the present embodiment, in the wide state illustrated in FIG. 2, the position of the third unit cam follower 231 partially overlaps with the position of the fourth unit cam follower 241 in the direction of the optical axis OA. This feature makes it possible to arrange the third lens unit L3 and the fourth lens unit L4 in proximity to each other, thereby enabling a reduction in size. As a result, a relative distance between the third lens unit-holding frame 23 and the fourth lens unit-moving tube 24A can be shortened, thereby enabling the entire lens barrel 1 to have a reduced size.

The leaf springs 247 are in contact with the image side-surface of the third lens unit-holding frame 23, and apply an urging force to increase the distance between the third lens unit-holding frame 23 and the fourth lens unit-moving tube 24A.

With this configuration, each third unit cam follower 231 is urged to come into contact with the cam's cut end face 154a while each fourth unit cam follower 241 is urged to come into contact with the cam's cut end face 154b, so that the third lens unit-holding frame 23 and the fourth lens unit-moving tube 24A can be made free of backlash in the direction of the optical axis OA. Note that the "backlash" as used herein refers to a relative movement caused by a manufacturing error between two tube members or by a clearance required for assembly and intentionally provided at a stage of machine design. The term "free of backlash" means elimination of the relative movement.

Thus, the present embodiment can make it less likely for the third lens unit-holding frame 23 and the fourth lens unit-moving tube 24A to fluctuate in posture.

In the present embodiment, the leaf springs 247 apply the urging force to increase the distance between the third lens unit-holding frame 23 and the fourth lens unit-moving tube 24A. The shape of the leaf springs 247 may be changed as appropriate. The three leaf springs 247 may be made continuous with each other to be formed into one spring member. Providing and fixing the three leaf springs 247 allow a lower resisting force to be generated at the time of shift adjustment of the lens frames, in comparison with a case where a compression spring or a tension spring is used. As a result, higher adjustment accuracy is achieved.

Forming the leaf spring 247 into an arc shape can ensure a long length of the leaf spring and makes it easy to reduce a spring constant. Accordingly, the arc-shaped leaf spring makes it easy to obtain a desired urging force and contributes to ensuring resistance when the spring is collapsed.

Further, since the fourth lens unit-moving tube 24A is urged by the springs, drive vibration caused when, for example, the stepping motor 243 drives the lens can be highly effectively absorbed, thereby contributing to noise reduction.

As described above, the fourth unit-guiding keys 246 are fitted in the third unit's guiding key grooves 233, the third unit-guiding keys 232 are fitted in the second unit's guiding key grooves 166, and the second unit-guiding keys 165 are fitted in the fixed tube's guiding key grooves 173. The rectilinear motion between the respective tubes is guided not by means of the cam followers, but by means of the guiding keys and the corresponding guiding key grooves between the respective tubes. This feature increases accuracy of the rectilinear motion between the respective tubes.

In the present embodiment, each of the third unit cam followers 231 and the fourth unit cam followers 241 includes a circular column member projecting in a radial direction and a rotatable roller attached to the circular column member. The third unit cam follower 231 and the fourth unit cam follower 241 are positioned while each being pressed onto the associate one of the cam's cut end faces of the cam groove 154. If the third unit cam follower and the fourth unit cam follower are configured to be positioned while being in contact with the two cut end faces of the cam groove as in the case of the second unit cam follower 161, it will be necessary to adjust the size of the roller in accordance with an individual difference of the cam groove and that of the cam follower in order to reduce backlash with respect to the two cut end faces of the cam groove. The present embodiment advantageously eliminates the need to measure the individual difference of the cam groove and that of the cam follower and the need to select the roller.

Second Embodiment

Next, a second embodiment will be described.

In the first embodiment, the leaf springs 247 apply the urging force to increase the distance between the third lens unit-holding frame 23 and the fourth lens unit-moving tube 24A, so that each third unit cam follower 231 is in contact with the cam's cut end face 154a of the fourth cam groove 154 closer to the object side and each fourth unit cam follower 241 is in contact with the cam's cut end face 154b of the fourth cam groove 154 closer to the image side.

Figure 9:
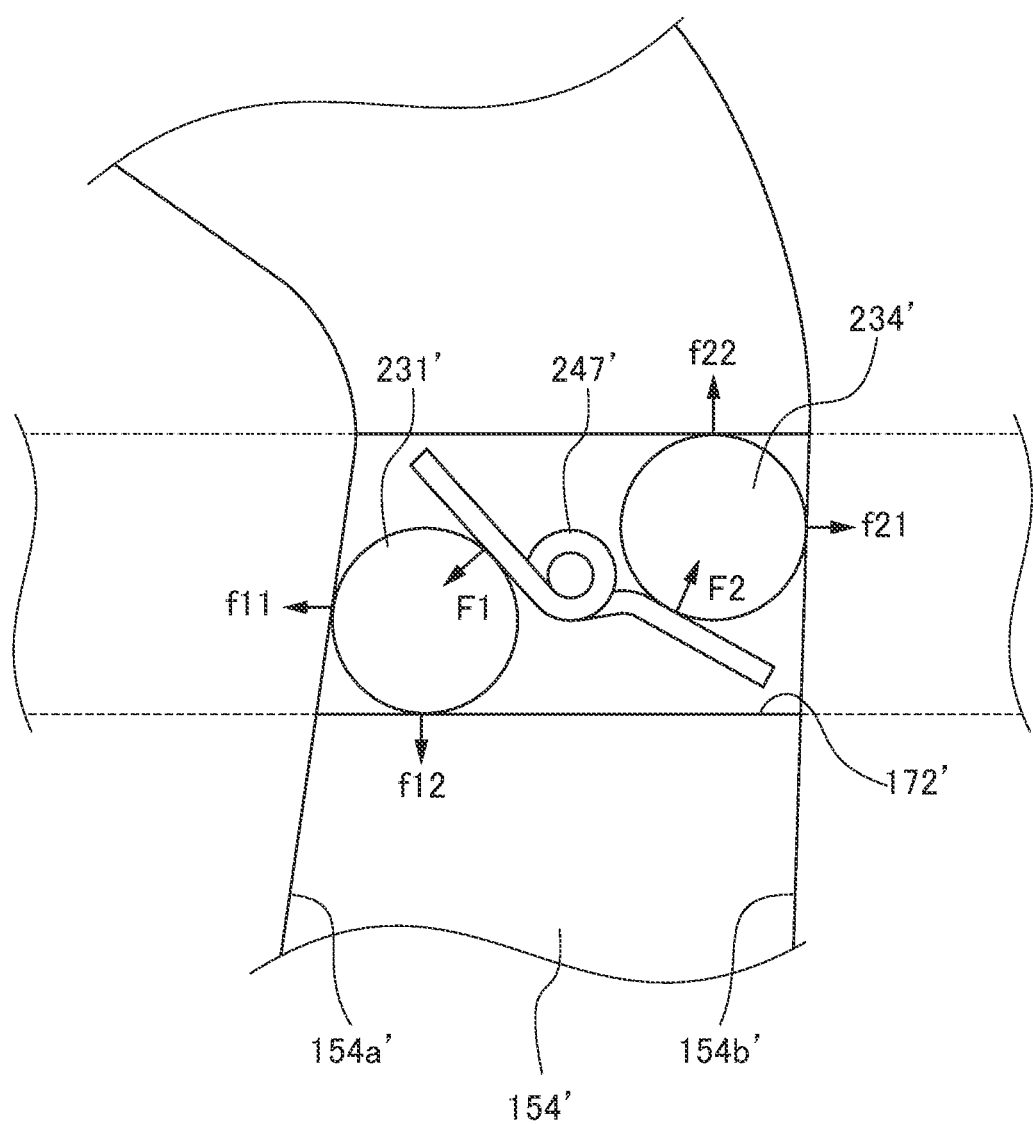
FIG. 9 illustrates a third unit cam follower 231' and a fourth unit cam follower 241' that are engaged with a fourth cam groove 154' and a rectilinear motion groove 172' of a second embodiment.

FIG. 9 illustrates a third unit cam follower 231' and a fourth unit cam follower 241' that are engaged with a fourth cam groove 154' and a rectilinear motion groove 172' of the second embodiment. The second embodiment excludes the leaf springs, but includes a torsion leaf spring 247' arranged between the third unit cam follower 231' and the fourth unit cam follower 241'.

The torsion leaf spring 247' presses a side surface of the third unit cam follower 231' and a side surface of the fourth unit cam follower 241'. Pressing forces F1 and F2 act in directions that are oblique to side surfaces of the rectilinear motion groove 172' and to both of cam's cut end faces 154a' and 154b' of the cam groove.

Accordingly, the pressing force F1 that presses the third unit cam follower 231' is resolved into component forces including a force f11 that presses the cam's cut end face 154a' of the cam groove and a force f12 that presses the side surface of the rectilinear motion groove 172'. The pressing force F2 that presses the fourth unit cam follower 241' is resolved into component forces including a force f21 that presses the cam's cut end face 154b' of the cam groove and a force f22 that presses the side surface of the rectilinear motion groove 172'. That is, the torsion leaf spring 247' urges the third unit cam follower 231 and the fourth unit cam follower 241 in a direction in which the cam followers are spaced apart from each other along the direction of the optical axis OA, and concurrently, in a direction in which the cam followers 231 and 241 are spaced apart from each other along a circumferential direction around the optical axis OA.

Accordingly, the third unit cam follower 231' and the fourth unit cam follower 241' also press the side surfaces of the rectilinear motion groove 172'. This feature can make the third lens unit-holding frame and the fourth lens unit-moving tube free from backlash in the circumferential direction with respect to the fixed tube 17.

In this case, since the backlash in the circumferential direction can be eliminated, rectilinear motion can be ensured without having to additionally provide the key grooves and keys for guiding rectilinear motion. Further, since the rectilinear motion groove 172' functions as one rectilinear motion groove for guiding rectilinear motion of both the third lens unit-holding frame and the fourth lens unit-moving tube, a simpler structure can be achieved, in comparison with a case where a rectilinear motion groove for the third unit and a rectilinear motion groove for the fourth unit are provided.

The embodiments described above are not intended to limit the present invention.

For example, in the embodiment, the third lens unit-holding frame 23 and the fourth lens unit-moving tube 24A that are arranged radially inside the cam tube 15 are provided with the third unit cam followers 231 and the fourth unit cam followers 241, respectively. However, this is a non-limiting example. A tube arranged radially outside the cam tube may be provided with cam followers.

In the embodiment, the case has been described in which the third lens unit-holding frame 23 provided with the third unit cam followers 231 and the fourth lens unit-moving tube 24A provided with the fourth unit cam followers 241 hold the third lens unit L3 and the fourth lens unit L4, respectively. However, this is a non-limiting example. The tube member provided with the cam followers may hold a different component, or may be a tube member not holding any lens.

In the embodiment, the rectilinear motion is guided by means of the rectilinear motion keys and guiding key grooves. However, this is a non-limiting example. The rectilinear motion may be guided by means of the cam grooves and the cam followers.

In the embodiment, the leaf springs 247 are used to apply the urging force to increase the distance between the third lens unit-holding frame 23 and the fourth lens unit-moving tube 24A. However, this is a non-limiting example. A tension spring may be used to apply a tension force to shorten the distance between the frame 23 and the tube 24A.

EXPLANATION OF REFERENCE NUMERALS

1: Lens barrel
11: Lens-Side Mount Part
12: Zoom Ring
13: Rotating tube
14: First Lens-Unit-Moving Rectilinear motion tube
15: Cam tube
16: Second Lens-Unit-Moving Rectilinear motion tube
17: Fixed tube
21: First Lens Unit-Holding Frame
22: Second Lens Unit-Holding Frame
23: Third Lens Unit-Holding Frame
24: Fourth Lens Unit-Holding Frame
24A: Fourth lens unit-moving tube
25: Fifth Lens Unit-Holding Frame
141: First Unit Cam Follower
151: First Cam Groove
152: Second Cam Groove
153: Third Cam Groove
154: Fourth Cam Groove
154a: Cam's Cut End Face
154b: Cam's Cut End Face
161: Second Unit Cam Follower
163: Main Guide Bar
164: Sub Guide Bar
165: Second Unit-Guiding Key
166: Second Unit's Guiding Key Groove
167: Rectilinear Motion Groove
171: Roller
172: Rectilinear Motion Groove
173: Fixed tube's Guiding Key Groove
231: Third Unit Cam Follower
232: Third Unit-Guiding Key
233: Third Unit's Guiding Key Groove
240: U-Shaped Engagement Portion
241: Fourth Unit Cam Follower
242: Fitting Portion
243: Stepping Motor
244: Lead Screw
245: Movable Member
246: Fourth Unit-Guiding Key
247: Leaf Spring

The invention claimed is:

1. A lens barrel comprising:
a cam groove at least a portion of which forms an angle with respect to a direction of an optical axis;
a rectilinear motion groove extending in the direction of the optical axis;
a cam tube having the cam groove;
a barrel member having the rectilinear motion groove and configured to rotate relative to the cam tube;
a first movable member having a first cam follower configured to move along a first surface of the rectilinear motion groove and a second surface of the cam groove, the first surface being located on one side of the rectilinear motion groove in a circumferential direction, and the second surface being located on one side of the cam groove in the direction of the optical axis; and a second movable member having a second cam follower configured to move along a third surface of the rectilinear motion groove and a fourth surface of the cam groove, the third surface being located on an other side of the rectilinear motion groove in the circumferential direction, and the fourth surface being located on an other side of the cam groove in the direction of the optical axis, wherein the first cam follower is not in contact with the third surface of the rectilinear motion groove, and the second cam follower is not in contact with the first surface of the rectilinear motion groove.

2. The lens barrel according to claim 1,
wherein at least a portion of the first cam follower and at least a portion of the second cam follower are at different positions in the direction of the optical axis and in the circumferential direction around the optical axis.

3. The lens barrel according to claim 1, further comprising:
an optical system at least a portion of which is arranged radially inside the cam tube,
wherein when an optical characteristic of the optical system changes, a spacing between the first cam follower and the second cam follower in the direction of the optical axis is variable.

4. The lens barrel according to claim 1,
wherein the first cam follower and the second cam follower are at different positions in the circumferential direction around the optical axis.

5. The lens barrel according to claim 1, further comprising:
a first guide portion configured to guide rectilinear motion of the first movable member in the direction of the optical axis; and
a second guide portion configured to guide rectilinear motion of the second movable member in the direction of the optical axis, the second guide portion being different from the first guide portion.

6. The lens barrel according to claim 5,
wherein the first movable member and the second movable member each include an engagement portion engaged with the rectilinear motion groove.

7. The lens barrel according to claim 6,
wherein the first guide portion is arranged in a first rectilinear motion groove as the rectilinear motion groove,
wherein the second guide portion is arranged in a second rectilinear motion groove as the rectilinear motion groove, the second rectilinear motion groove being different from the first rectilinear motion groove,
wherein the first movable member includes a first engagement portion engaged with the first rectilinear motion groove,
wherein the second movable member includes a second engagement portion engaged with the second rectilinear motion groove, and
wherein the second rectilinear motion groove is formed on the first movable member.

8. The lens barrel according to claim 7,
wherein the first rectilinear motion groove is formed on a tube-shaped member different from the first and second movable members.

9. The lens barrel according to claim 6,
wherein the first movable member includes a first engagement portion configured to move along the first surface of the rectilinear motion groove, and
wherein the second movable member includes a second engagement portion configured to move along the third surface of the rectilinear motion groove.

10. The lens barrel according to claim 9,
wherein the first cam follower of the first movable member includes the first engagement portion, and
wherein the second cam follower of the second movable member includes the second engagement portion.

11. The lens barrel according to claim 1, further comprising:
an urging member that urges the first movable member and the second movable member respectively in the direction of the optical axis.

12. The lens barrel according to claim 1,
wherein the lens barrel is changeable between a barrel retraction state and a ready-to-image state, and
wherein when the lens barrel changes from the ready-to-image state to the barrel retraction state, a distance between the first cam follower and the second cam follower in the direction of the optical axis remains constant.

13. The lens barrel according claim 1, further comprising:
a movable lens arranged radially inside the second movable member and movable in the direction of the optical axis; and
a drive unit fastened to the second movable member and configured to move the movable lens in the direction of the optical axis.

14. The lens barrel according to claim 13, further comprising:
a guide shaft configured to guide the movable lens in the direction of the optical axis; and
a tube-shaped member having the guide shaft fixed thereto and having the rectilinear motion groove for guiding at least one of the first movable member and the second movable member in the direction of the optical axis.

15. The lens barrel according to claim 1,
wherein the first cam follower and the second cam follower have an identical shape when viewed from an outer circumferential direction.

16. The lens barrel according to claim 1,
wherein at least one of the first cam follower and the second cam follower has a circular shape when viewed from an outer circumferential direction.

17. The lens barrel according to claim 1,
wherein at least one of the first cam follower and the second cam follower is in point contact with the rectilinear motion groove or the cam groove.

18. An optical device comprising the lens barrel according to claim 1.

* * * * *